United States Patent Office 3,405,806
Patented Oct. 15, 1968

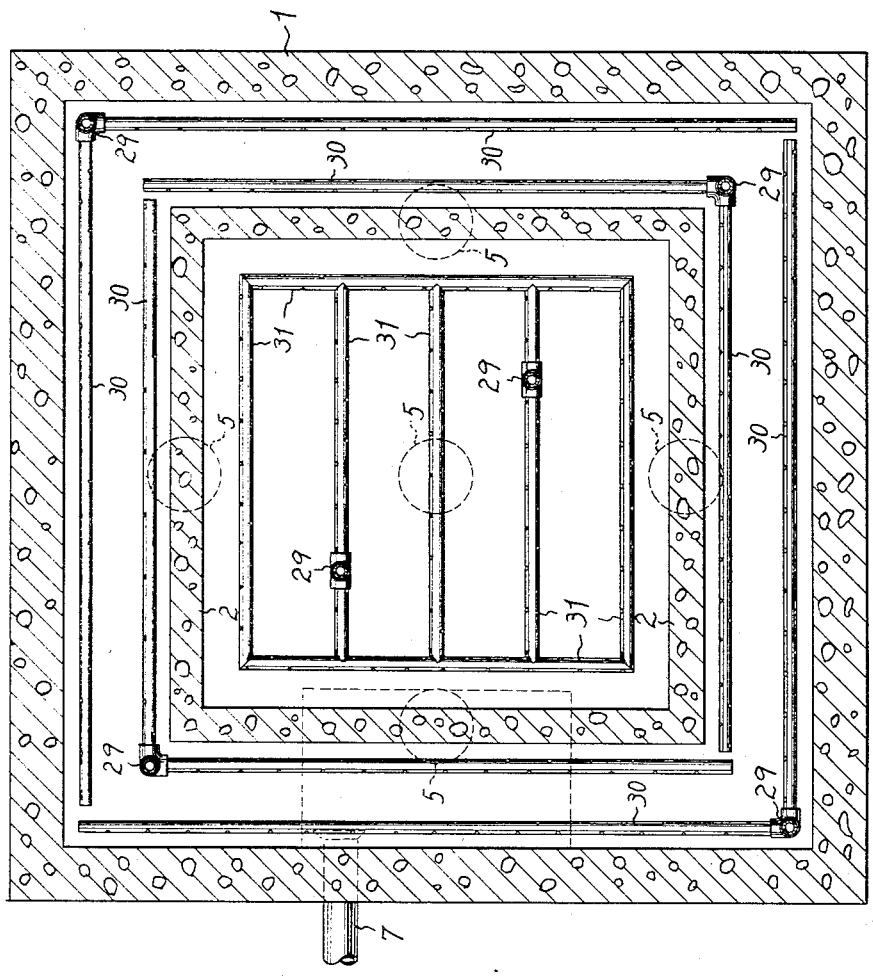

3,405,806
WATER FILTRATION PLANT
Tamotsu Okada, 9 Umegae-cho 1, Gifu, Japan
Filed May 13, 1966, Ser. No. 550,052
12 Claims. (Cl. 210—203)

ABSTRACT OF THE DISCLOSURE

A water filtration plant having an aeration chamber, a first filter bed, a sedimentation chamber and a second filter bed. Raw water is supplied and discharged as an upward spray of water into the aeration chamber. The aerated water passes downwardly through the first filter bed to the sedimentation chamber where the precipitate by the aeration of water and other heavier impurities settle to the bottom of the chamber. The effluent from the sedimentation chamber passes upwardly through the second filter bed by the static pressure head of water in the plant. The filtered pure water is removed from the top of the second filter bed. The first and second filter beds are provided with injectors for supplying clear water containing bubbles of air to the lowermost layers of the filter beds for washing and cleaning the filter beds by the upward flow of air and water.

---

This invention relates to the filtration of water and more particular to an improved plant for the filtration of water in the form of slow filters.

The conventional slow filtration plant involves the use of a large tank, at the bottom of which tank is a grating or false bottom; above this is coarse gravel or crushed rock of graded size; at the very top are layers of quartz sand of uniform size. Through the beds of sand and gravel the water steeps vertically downward into an underdrain system. According to conventional filtration plant by such the downward-flowing of water, after operating for relatively few days the resistance to further passage of water becomes so great that the top layers of sand must be removed or washed in place. This is due to the fact that most of suspended impurities are removed in the top inch or two of the sand beds. In order to recover a good rate of filtration, the filtering beds in conventional filtration plants must be frequently cleaned. Thus the conventional plants cannot be operated continuously for a long time. The capacity of conventional sand-bed filter is determined by the surface area of the beds, thus the plants require large floor space, resulting in the increase of the cost of construction.

A successful solution has been suggested for the filtration of water by supplying the water to be filtered to the bottom of filtration tank which has lower layers of gravel-bed and upper layers of sand-bed. Suspended impurities travel for some distance along the tortuous path of the fluid through the beds of which interstices decrease gradually. Then the impurities will be entrapped in the interstices sooner or later. Thus clear effluent will appear on the surface of the filtering beds, which effluent may be drawn off by means of suitable conduits. In this way the impurities removed are distributed over a volume of filtering beds that is sufficient to prevent blinding and stoppage of filtration. The present invention has for its object to improve such a filtration plant as mentioned above wherein the clear water is obtained from the surface of filtering beds.

A further object of the invention is the provision of an improved water filtration plant having means for aerating the water to oxidize the metallic impurities in the water to insoluble state. This aeration serves also to sterilize water.

A still further object of the invention is the provision of an improved water filtration plant having two compartments of filtering beds provided therebetween a sedimentation chamber where the greater part of impurities are removed by precipitation.

A still further object of the invention is the provision of an improved water filtration plant having means for washing the filtering beds from time to time to recover nonblinded filters by air agitation together with upward-flowing of clear water.

The above and other objects and advantages of the invention will be apparent from the following description of a preferred form of the invention, reference being made to the accompanying drawings, wherein:

FIG. 3 is a transverse sectional view taken along line III—III of FIG. 2.

Figure 2:
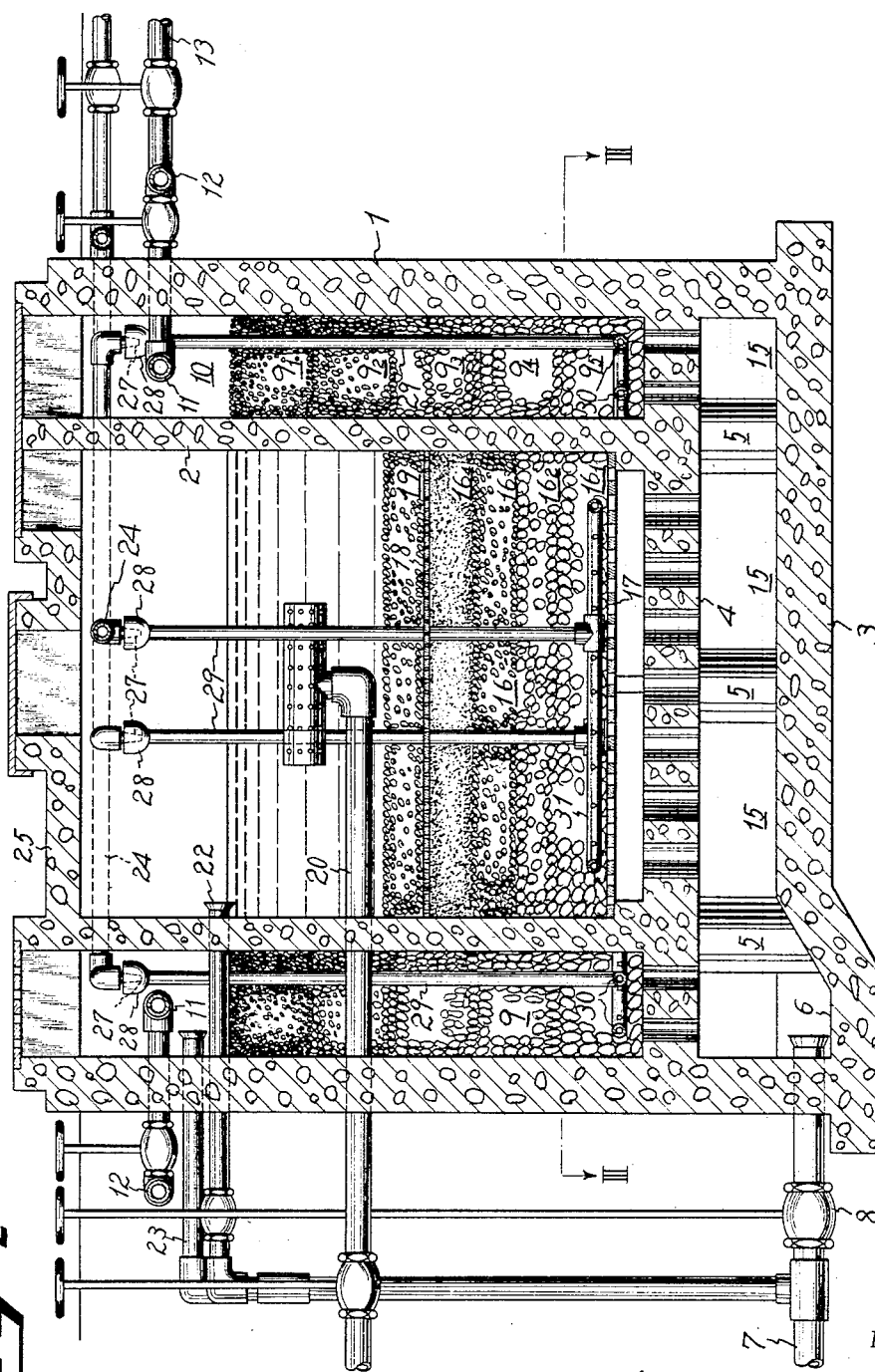
FIG. 2 is a side sectional view taken along line II—II of FIG. 1.

In the preferred form of the invention the plant comprises a tank which may be formed of concrete and buried in the earth, as is illustrated in the drawings, especially in FIG. 2. This tank is a double-walled vessel comprising an outer wall 1, inner wall 2, bottom wall 3 and grating or false bottom 4. Designated by reference numerals 5, 5 are the supports of false bottom 4. The bottom wall 3 has a sump forming wall 6 which collects settled materials which may be drawn off from time to time through a pipe 7 having a control valve 8.

A filtering bed 9 is constructed on the false bottom 4 between the outer wall 1 and inner wall 2. It is preferred to construct the filtering bed 9 by arranging layers of coarse gravel or crushed rock of severally graded sizes. In the typical illustration as shown, the filtering bed 9 consists of five layers of different sizes of gravel, the size of which gravel increases downwardly. The uppermost layers $9_1$ are relatively small size of gravel; and the lowermost layers $9_5$ are the largest size of gravel in the filtering bed 9.

The outer wall 1 and inner wall 2 form therebetween a rectangular space or chamber 10 above the filtering bed 9. Arranged along the square of chamber 10 are pipes 11, 11 which lead to a manifold 12 connected to the main pipe 13 through which the water to be filtered is introduced into the filtration plant. The upper side wall of each pipe 11 is provided with spaced holes or slots 14, 14 through which holes or slots the water jets out upwardly with velocity depending on the head. It is preferred to give enough head to the pipes 11 so that water sprays upwardly in a finely divided state from holes 14. The fine upward spraying of water causes it to mingle intimately with atmospheric air. Thus the water is aerated when it is a jet of water and before it drops on the filtering bed 9.

This aeration causes the iron, manganese, carbonate and ammonium, which are dissolved in the water, to oxidize to insoluble state. This aeration serves also to sterilize the water.

Then the water flows downwardly through the interstices between gravel of filtering bed 9 from its uppermost layers $9_1$ to the lowermost layers $9_5$ and enters a chamber 15 formed between the bottom wall 3 and false bottom 4. The area of the filter bed 9 is considerably large with respect to the diameter of the main pipe 13 so that the rate of flow through the filter bed 9 is reduced uniformly. As described above, the filter bed 9 is constructed with not so fine filter medium. Thus the filter bed 9 functions firstly to reduce the rate of flow and secondly to remove larger particles of impurities from water. As the aerated water flows gently from the top to the bottom of filter bed 9, the water is given a period of time enough to proceed the oxidation reaction with the commingled air. This permits removal of the iron and manganese as insolubilized oxidation products. The resulting precipitates by aeration and other solid heavier impurities settle to the bottom 3. The settled materials or mud can be discharged from time to time through the pipe 7 as previously described. Thus the greater part of turbidity is removed at the sedimentation chamber 15.

The effluent from the sedimentation chamber 15 passes through the false bottom 5 and is driven to flow in or caused to infiltrate into a second filtering bed 16 which is constructed on the false bottom 4. As a typical illustration, shown in FIG. 2, the second filtering bed 16 consists of four layers of beds of which particle size decreases upwardly, i.e., the lowermost layers $16_1$ of coarse gravel placed on a screen plate 17 supported by false bottom 5; layers $16_2$ of gravel smaller than $16_1$; layers $16_3$ of small gravel and the uppermost layers $16_4$ of quartz sand. Another screen plate 18 is preferably laid on the sand bed $16_4$ in order to prevent the beds from falling into disorder, by the action of upward-flowing of water, of the regulated layers of beds. Placed on the screen plate 18 is layers of small gravel 19 which serves to filter the water and to hold the screen plate 18 with the filtering beds 16 in place against the upward-flowing of water.

The screen plate 17 functions to distribute the upward energy of water as well as to support the filter medium in situ in the bed 16.

The impurities, solid or soft particles which are suspended in the effluent from the sedimentation chamber 15, will travel for some distance along the tortuous path of the fluid through the beds 16 of which interstices decrease gradually. But the particles will be entrapped in the interstices sooner or later. Thus clear effluent will appear on the filter bed 19. In this way the soft particles removed are distributed over a volume of filter beds 16 and 19 that is sufficient to prevent blinding and stoppage of filtration. It is possible, therefore, to operate the filtration plant continuously for a long time without decreasing the rate of filtration.

The clarified water can be drawn off the plant through a pipe 20. Opened into the effluent chamber 21 at the upper portion thereof is an overflow pipe 22 to discharge a surplus of clarified water. Another overflow pipe 23 opens into the aeration chamber 10 to keep the atmospheric space above the first filter bed 9. The flow of water from the aeration chamber 10 to the discharge pipe 20 is by gravity flow only. Thus, during normal operation, the plant of the invention needs no pump means for the filtration of water.

When the filter beds are blinded by the removed particles or slimy substances contained in the water, the beds may be backwashed with clear fluid to clean the beds. This backwashing can be carried out by discharging clear water into the effluent chamber 21 after the stoppage of introduction of water from the main pipe 13.

Figure 1:
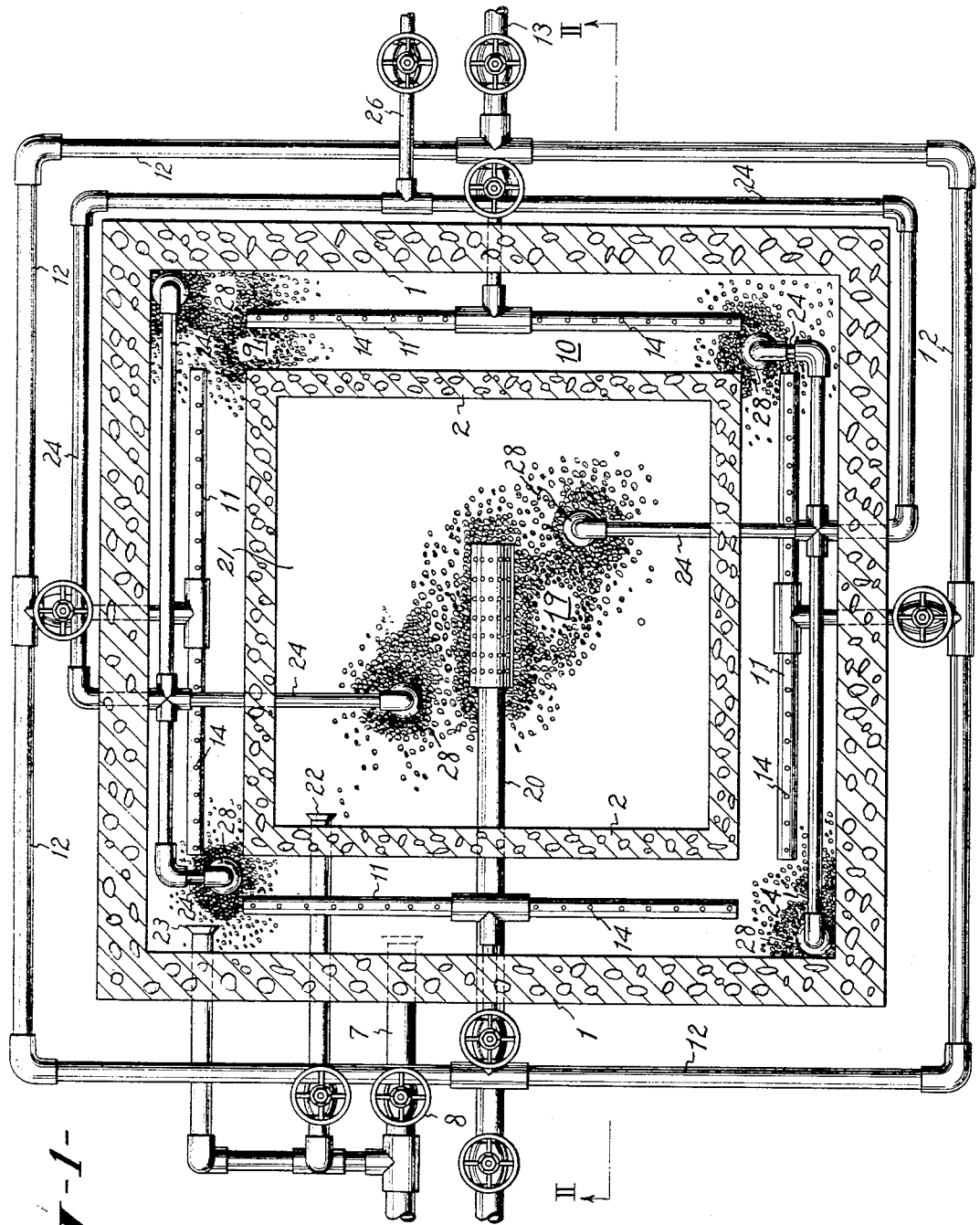
FIG. 1 is a top plan view of a water filtration plant, with the top wall removed, embodying the invention.

According to the present invention, however, the filtration plant is provided with special means for washing the filtering beds in order to promote more effective cleaning of the beds. As shown in FIGS. 1 and 2, a manifold 24 is placed beneath the top wall 25 of the tank of filtration plant. The manifold 24 is connected to a suitable source of clear pressure water by means of a pipe 26. The manifold 24 has several nozzles 27, 27 which form injector devices with cup-shaped member 28, 28, respectively. The bottom of each cup-shaped member 28 is lead by means of a vertical pipe 29 to the lowermost layers $9_5$ or $16_1$ of the filtering beds 9 or 16, respectively, and is connected to slender distributing pipes 30 or 31, respectively. The distributing pipes 30 and 31 have a large number of perforations, respectively. Thus the pressure water or "motive fluid" from the nozzles 27, 27 induces the flow of air into the distributing pipes 30 and 31. As a result, air is discharged in bubbles from the pipes 30 and 31 together with clear water. This clear water containing bubbles of air flows toward the surface of filtering beds 9 and 16 and washes the beds. In this way the expansive power of each bubble of air tends to act to widen the interstices in the filtering beds and causes to release the impurities plugged in or trapped between the particles that constitute the filtering beds or tear off the slimy substances adhered to the particles. The washing water may be discharged through the overflow pipes 22 and 23 or through, if necessary, the pipe 20. After operating the washing for ample time to clean the filtering beds 9 and 16, the supply of water to the manifold 24 is stopped and the control valve 8 is opened to draw out the washing water from the bottom of tank. Then the filtering beds 9 and 16 can recover their non-blinded pores. Thus, the filtration plant of the invention is ready to start again its water supply service when the final residue of washing water is drained off the pipe 20.

The piping of distributing pipes 30 and 31 is not critical. FIG. 3 suggests an example of piping for the distribution of clear water containing bubbles of air. The point is the uniform generation of upward-flowing of clear water containing bubbles of air all over the filtering beds at the lower layers thereof.

What I claim is:

1. A water filtration plant comprising a first chamber providing an atmospheric space in the upper portion thereof and a filter bed therebeneath, means for introducing raw water into the atmospheric space of said first chamber and for spraying the water upwardly so that the water is aerated to oxidize the metal contents to insoluble state, a sedimentation chamber provided beneath said filter bed, a second chamber concentric to and surrounded by said first chamber, a second filter bed provided in said second chamber for passing the effluent upwardly therethrough from said sedimentation chamber, said second filter bed consisting of layers of filtration medium of which interstices decrease gradually towards the top of the bed, said second chamber providing above said second filter bed a reservoir for the filtered pure water, means for conveying the filtrate from said first filter bed by gravity to the reservoir of the filtered water, means for removing the filtered pure water from said reservoir, and jet pump means adapted to discharge clear water under pressure into pipes extending to the lowermost layers of said filter beds, respectively, said jet pump means being operative to draw in atmospheric air to promote the washing of the filter beds by the upwardly-flowing of air and water.

2. A water filtration plant as defined in claim 1 wherein said means for spraying raw water upwardly comprising a manifold arranged above the first filter bed and having outlet openings on the upper side wall of the manifold to discharge the water in a finely divided state.

3. A water filtration plant as defined in claim 1 wherein said first filter bed comprising layers of gravel of which particle size increases gradually downwardly towards the bottom of the bed.

4. A water filtration plant as defined in claim 1 wherein said first and second filter beds are constructed on a false bottom through which they communicate with said sedimentation chamber.

5. A water filtration plant as defined in claim 4 further including a screen plate for supporting said second filter bed and for distributing the upwardly-flowing energy of the effluent from said sedimentation chamber.

6. A water filtration plant as defined in claim 1 wherein said second filter bed has a sand bed in the top thereof.

7. A water filtration plant as defined in claim 6 further including a screen plate placed on the top of the said bed and layers of small gravel for preventing the second filter bed from falling into disorder against the upwardly-flowing of the filtrate.

8. A water filtration plant as defined in claim 1 wherein said jet pump means including a water discharge nozzle positioned to discharge into an upstanding pipe which opens at one end thereof to atmosphere and is connected at the other end thereof to a manifold arranged in the bottom of the filter beds, said manifold having perforations for discharging the water and air to the filter beds.

9. A water filtration plant as defined in claim 1 wherein the means for keeping the atmospheric space above the filter beds consists of overflow pipes opened into said first and second chambers at the position above the top of the filter beds but below the outlet of the means for spraying the raw water.

10. A water filtration plant as defined in claim 9 wherein said over-flow pipes are operative to discharge therethrough the waste water when the filter beds are washed by the upwardly flowing water which is discharged from said pipes.

11. A water filtration plant comprising a double-walled vessel providing an outer chamber concentric to and surrounding an inner chamber and a bottom chamber beneath the outer and inner chambers; the bottom chamber being communicated with the outer and inner chambers through a grating and having means for removing settled material from time to time; the outer chamber providing an atmospheric space in the upper portion thereof and a filter bed therebeneath, the filter bed of said outer chamber being constructed with layers of gravel of which interstices increase gradually toward the bottom of the bed; means for introducing raw water into the atmospheric space of said outer chamber and for spraying the water upwardly in a finely divided state; means for keeping water level in said outer chamber so that the upwardly-spraying water is given enough time to contact with the atmospheric air before it falls on the filter bed; the inner chamber providing a filter bed in the lower portion thereof and a reservoir of water thereabove, the filter bed of said inner chamber being constructed with the top layers of sand and lower layers of gravel so as to decrease gradually the interstices of the filter bed toward the top of the bed; means for removing the filtered pure water from the reservoir of said inner chamber so that the water flows from the outer chamber by gravity to the inner chamber; manifold means arranged in the lowermost layers of the filter beds of said outer and inner chambers, conduits means for connecting said manifold means to atmosphere; water nozzle means for discharging clear water under pressure into the ends of said conduit means which are opened to the atmosphere, said water nozzle means being operative to draw in atmospheric air and discharge clear water into the lowermost layers of the filter beds so that an upwardly-flowing stream of water and air is produced through the filter beds for washing and cleaning the beds; and above-mentioned means for keeping the water level in said outer and inner chambers being operative to discharge the waste water when the filter beds are washed by the upwardly-flowing water which is discharged from distributing pipes arranged near the bottom of said beds.

12. A water filtration plant comprising a double-walled vessel providing an outer chamber concentric to and surrounding an inner chamber and a bottom chamber beneath the outer and inner chambers; the bottom chamber being communicated with the outer and inner chambers through a false bottom and having means for removing settled material; the outer chamber providing an atmospheric space in the upper portion thereof and a filter bed therebeneath, the filter bed of said outer chamber being constructed with layers of gravel of which particle size increase gradually toward the bottom of the bed; pipe and manifold means for introducing raw water into the atmospheric space of said outer chamber, said manifold being positioned well above the top of the filter bed of said outer chamber and having openings at regular intervals for spraying the water therethrough upwardly in a finely divided state to contact with the air in said atmospheric space; an overflow pipe opened into said outer chamber at the position near the top of the filter bed; the inner chamber providing a filter in the lower portion thereof and a reservoir of filtered pure water thereabove, the filter of said inner chamber being constructed with a first or lower filter bed and a second or upper filter bed, the first filter bed of said inner chamber having the top layers of sand and lower layers of gravel arranged in tiers to increase the interstices towards the bottom of said bed, the second filter bed of said inner chamber being operative to hold the tiers of said first filter bed against the upwardly-flowing of water, said first filter bed of said inner chamber being constructed on a screen plate which is operative to distribute the upwardly-flowing energy of water; an overflow pipe opened into said inner chamber for keeping water level in said inner chamber so that the filtrate flows from the outer chamber by gravity to the inner chamber; a pipe means having its inlet opening positioned near the top surface of said second filter bed in said inner chamber for removing the filtered pure water from the reservoir of water; manifold means arranged horizontally in the lowermost layers of the filter beds of said outer and inner chambers, respectively, conduits means for connecting said manifold means to atmosphere; water nozzle means for discharging clear water under pressure into the upper open ends of said conduit means, said water nozzle means and conduits means being operative to draw in atmospheric air and discharge clear water into the lowermost layers of the filter beds so that an upwardly-flowing stream of water and air is produced through the filter beds for washing and cleaning the filter beds; and above-mentioned overflow pipes in the outer and inner chambers being operative to discharge therethrough the waste water when the filter beds are washed by the upwardly-flowing water which is discharged from distributing pipes arranged near the bottom of said beds.

References Cited

UNITED STATES PATENTS

| | | | |
|---|---|---|---|
| 593,666 | 11/1897 | Jewell et al. | 210—274 |
| 623,439 | 4/1899 | Suman | 210—284 |
| 862,314 | 8/1907 | Decker | 261—6 |
| 938,075 | 10/1909 | Reisert | 210—151 X |
| 1,985,435 | 12/1934 | Watson | 210—151 X |
| 2,237,711 | 4/1941 | Morgan | 210—151 |
| 2,697,520 | 12/1954 | Ellila | 210—274 X |
| 3,123,556 | 3/1964 | Gilbert | 210—151 |
| 3,265,370 | 8/1966 | Scholten | 210—264 X |

FOREIGN PATENTS

| | | |
|---|---|---|
| 6,946 | 1904 | Great Britain. |
| 541,560 | 12/1941 | Great Britain. |

REUBEN FRIEDMAN, *Primary Examiner.*

J. ADEE, *Assistant Examiner.*